United States Patent
Liu et al.

(10) Patent No.: US 11,899,243 B2
(45) Date of Patent: Feb. 13, 2024

(54) SYSTEM AND METHOD FOR JOINING FIBER OPTIC CABLES

(71) Applicant: Schlumberger Technology Corporation, Sugar Land, TX (US)

(72) Inventors: Zhanke Liu, Sugar Land, TX (US); Mark Oettli, Richmond, TX (US); Shrividya Sridharan, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/660,464

(22) Filed: Apr. 25, 2022

(65) Prior Publication Data

US 2023/0341626 A1    Oct. 26, 2023

(51) Int. Cl.
*G02B 6/255* (2006.01)
*G02B 6/38* (2006.01)

(52) U.S. Cl.
CPC ......... *G02B 6/2558* (2013.01); *G02B 6/2551* (2013.01); *G02B 6/38* (2013.01)

(58) Field of Classification Search
CPC ....... G02B 6/2551; G02B 6/2558; G02B 6/38
See application file for complete search history.

(56) References Cited

U.S. PATENT DOCUMENTS

| | | | | |
|---|---|---|---|---|
| 4,580,874 A * | 4/1986 | Winter | ................. | G02B 6/2558 264/36.19 |
| 4,585,287 A | 4/1986 | Ramsey et al. | | |
| 6,099,170 A * | 8/2000 | Sarbell | ................ | G02B 6/2558 385/95 |
| 6,338,579 B1 * | 1/2002 | Winiarski | ........... | G02B 6/4471 385/98 |
| 6,496,625 B1 * | 12/2002 | Falkowich | .......... | G02B 6/3801 385/100 |
| 6,499,891 B1 * | 12/2002 | Stevenson | ........... | G02B 6/2558 385/95 |
| 6,779,931 B2 * | 8/2004 | Murata | ................ | G02B 6/2558 385/98 |
| 6,931,194 B2 * | 8/2005 | Dowd | .................. | G02B 6/4471 385/135 |
| 7,403,686 B1 * | 7/2008 | Zervas | ................. | G02B 6/3801 65/408 |
| 7,410,308 B2 * | 8/2008 | Qian | ..................... | G02B 6/255 385/95 |

(Continued)

FOREIGN PATENT DOCUMENTS

EP    0926519 A1    7/2005

OTHER PUBLICATIONS

International Search Report and Written Opinion issued in International Patent application PCT/US2023/019612 dated Aug. 24, 2023, 10 pages.

*Primary Examiner* — Ryan A Lepisto
(74) *Attorney, Agent, or Firm* — Jeffrey D. Frantz

(57) ABSTRACT

A method for joining fiber optic cables includes sliding a sleeve over a first fiber optic cable, joining a first set of optical fibers of the first fiber optic cable to a second set of optical fibers of a second fiber optic cable, sliding the sleeve over the first and second fiber optic cables, and joining the sleeve to a first exterior casing of the first fiber optic cable and to a second exterior casing of the second fiber optic cable.

17 Claims, 5 Drawing Sheets

(56) References Cited

U.S. PATENT DOCUMENTS

| | | | | |
|---|---|---|---|---|
| 7,918,612 B1* | 4/2011 | Zhao | ............... | G02B 6/2553 |
| | | | | 385/95 |
| 8,096,712 B2* | 1/2012 | Solomon | ............ | G02B 6/3801 |
| | | | | 385/98 |
| 8,696,221 B2* | 4/2014 | Vastmans | ........... | G02B 6/2558 |
| | | | | 385/99 |
| 8,737,774 B2* | 5/2014 | MacDougall | ......... | G01K 1/026 |
| | | | | 385/12 |
| 9,063,286 B2* | 6/2015 | Durrant | ............. | G02B 6/2558 |
| 11,587,698 B2* | 2/2023 | Glasscock | ........... | E21B 17/003 |
| 2007/0160332 A1* | 7/2007 | Qian | .............. | G02B 6/2558 |
| | | | | 385/95 |
| 2007/0284117 A1 | 12/2007 | Smithson | | |
| 2008/0056639 A1 | 3/2008 | MacDougall et al. | | |
| 2016/0003669 A1* | 1/2016 | Lee | ............... | G01H 9/004 |
| | | | | 73/655 |
| 2019/0316425 A1 | 10/2019 | Wisinger, Jr. et al. | | |
| 2020/0379176 A1* | 12/2020 | Rossi | ............... | G02B 6/3801 |

* cited by examiner

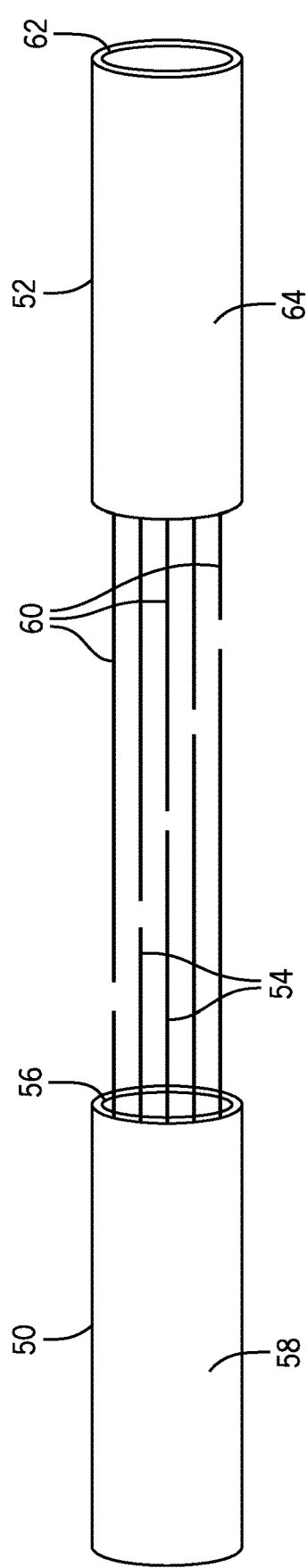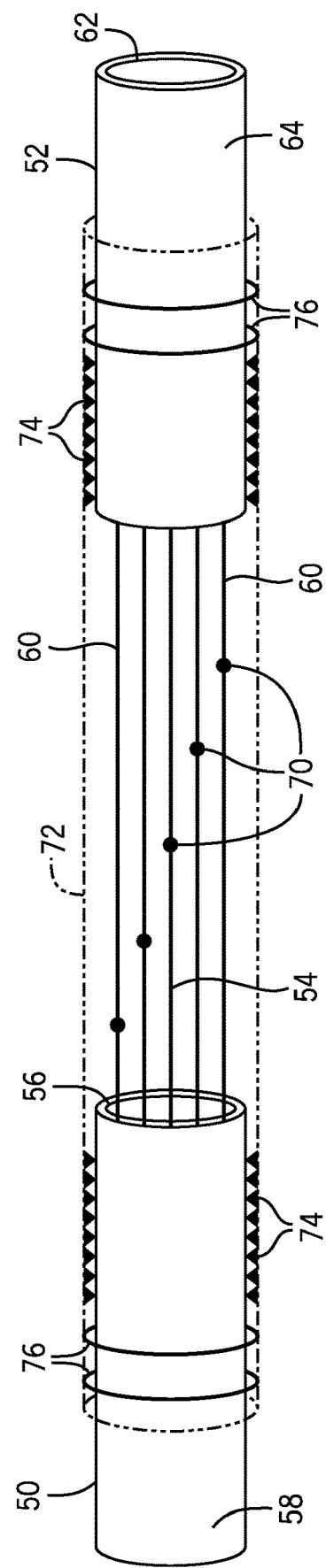

SYSTEM AND METHOD FOR JOINING FIBER OPTIC CABLES

BACKGROUND

The subject matter disclosed herein relates to systems and methods for joining two fiber optic cables, for example, for use with downhole tools.

Wellbore operations often employ fiber optic cables to connect surface-level equipment to downhole tooling. The fiber optic cables include optical fibers surrounded by exterior casings to protect the optical fibers from downhole environmental factors. In some circumstances, it may be desirable to join two lengths of fiber optic cable. Unfortunately, joining exterior casings may interfere with joining optical fibers, and vice versa.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for joining fiber optic cables includes sliding a sleeve over a first fiber optic cable, joining a first set of optical fibers of the first fiber optic cable to a second set of optical fibers of a second fiber optic cable, sliding the sleeve over the first and second fiber optic cables, and joining the sleeve to a first exterior casing of the first fiber optic cable and to a second exterior casing of the second fiber optic cable.

In another embodiment, a method for joining a pair of fiber optic cables for use in a wellbore site operation includes sliding a sleeve over a first fiber optic cable, joining a first set of optical fibers of the first fiber optic cable to a second set of optical fibers of a second fiber optic cable, sliding the sleeve over the first and second fiber optic cables, and joining the sleeve to a first exterior casing of the first fiber optic cable and to a second exterior casing of the second fiber optic cable. The method also includes utilizing the first fiber optic cable and the second fiber optic cable to communicate an optical signal to or from a downhole tool. The method may further include retrieving the downhole tool from the wellbore, joining the fiber optic cables at a surface of the wellbore, disposing the downhole tool and joined fiber optic cables into the wellbore and performing a wellbore operation, including communicating an optical signal to or from a downhole tool while performing the wellbore operation.

In yet another embodiment, an assembly for a joined fiber optic cable includes a first fiber optic cable that includes a first plurality of optical fibers and a first exterior casing. The assembly also includes a second fiber optic cable that includes a second plurality of optical fibers and a second exterior casing. The first plurality of optical fibers is joined to the second plurality of optical fibers. The assembly also includes a sleeve that partially overlaps the first exterior casing and the second exterior casing, and the sleeve is joined to the first exterior casing and the second exterior casing.

BRIEF DESCRIPTION OF THE DRAWINGS

Various aspects of this disclosure may be better understood upon reading the following detailed description and upon reference to the drawings in which:

FIG. 2 is a perspective view of a pair of separated fiber optic cables, in accordance with the present disclosure;

FIG. 3 is a perspective view of two joined fiber optic cables, in accordance with the present disclosure;

DETAILED DESCRIPTION OF SPECIFIC EMBODIMENTS

Figure 1:
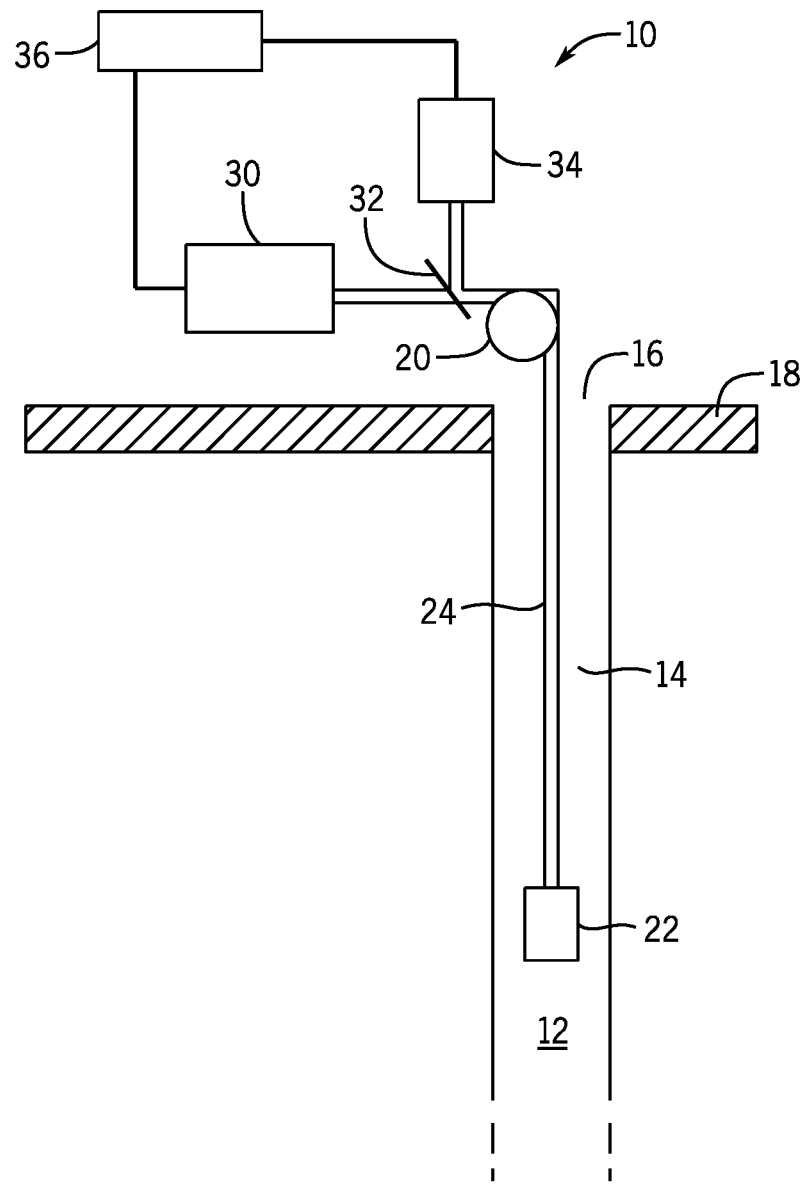
FIG. 1 is a schematic diagram of a wellbore site employing fiber optic-connected tools, in accordance with the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

In addition, as used herein, the terms "automatic" and "automated" are intended to describe operations that are caused to be performed, for example, by an automation control system (i.e., solely by the automation control system, without human intervention).

As generally discussed above, wellbore operations often employ fiber optic cables to quickly communicate between surface-level equipment (e.g., a controller) and downhole tooling. In some cases, it may be desirable to join two pieces of fiber optic cable together. For example, during a downhole or wellbore operation, many hazards such as high temperatures, pressure, tension caused by a downhole tool, and so forth, may damage the fiber optic cables, resulting in snapping or casing damage. In another example, a portion of fiber optic cable may experience relatively high temperatures and pressures downhole. An operator may employ a length of high-temperature (e.g., capable of operating in temperatures above 200° C., for example) fiber optic cable in high temperature downhole areas. However, in an effort to decrease cost, the operator may desire to join the high-temperature fiber optic cable to a length of low-temperature (e.g., capable of operating in temperatures up to 120° C.) fiber optic cable that will not be exposed to high temperature downhole areas. However, methods for joining inner components of fiber optic cable and methods for joining exterior components of fiber optic cable may conflict. For example, joining optical fibers of two lengths of fiber optic cable may require removal of an exterior casing. In another example, joining exterior casing of two lengths of fiber optic casing may employ a joining method (e.g., welding, brazing, soldering, and so forth) that may potentially damage the optical fibers. Accordingly, a method for joining two lengths of fiber optic cable that does not risk damaging the optical fibers is desirable.

The present disclosure is directed to techniques for joining separate pieces of fiber optic cable. Generally, a method may include sliding a sleeve over a first fiber optic cable. The method may then include joining optical fibers of the first fiber optic cable to optical fibers of a second fiber optic cable. An operator may then slide the sleeve over the joined optical fibers and join the sleeve to exterior casings of the first fiber optic cable and the second fiber optic cable. Techniques may also include testing the joined fiber optic cables. The testing may include attenuation loss testing, mechanical testing, and pressure testing, among other types of testing.

With this in mind, FIG. 1 is a schematic diagram of a wellbore site 10 employing fiber optic-connected tools. The wellbore site 10 may include a plurality of devices (e.g., surface-level electronic equipment, downhole wellbore tools, etc.) to perform an operation (e.g., drilling operation, an intervention operation such as a coiled tubing operation or the like, an analysis operation, and so forth) in the wellbore 12. The wellbore 12 may include a wellbore shaft 14 and a wellbore mouth 16 at an upper end of the wellbore shaft 14 at a surface 18. At the wellbore mouth 16, a spooling device 20 may lower a downhole tool 22 into the wellbore 12 via a fiber optic cable 24. The downhole tool 22 may include sensors, an open end of optical fiber, and so forth. The downhole tool 22 may be coupled to the fiber optic cable 24. The fiber optic cable 24 may include a plurality of optical fibers configured to transmit optical data between a first end and a second end of the fiber optic cable 24. In certain embodiments, the plurality of optical fibers may be surrounded by an exterior casing configured to protect the plurality optical fibers (e.g., from structural damage, from extreme temperatures and/or pressures in a downhole environment, and so forth). The fiber optic cable 24 may communicably couple the downhole tool 22 to equipment at the surface 18 of the wellbore site 10.

The wellbore site 10 may include various pieces of equipment for controlling and communicating with the downhole tool 22. To this end, in certain embodiments, the wellbore site 10 may include an electromagnetic source 30. The electromagnetic source 30 may generate an electromagnetic signal (e.g., a light signal) and send the electromagnetic signal to the downhole tool 22 via the fiber optic cable 24. Likewise, the downhole tool 22 may send electromagnetic signals via the fiber optic cable 24. In certain embodiments, a beam splitter 32 may direct a portion of the electromagnetic signal (e.g., backscatter) toward an optical detector 34. The optical detector 34 may receive the electromagnetic signal and transmit data of the electromagnetic signal to a processor 36. The processor 36 may be any type of computer processor or microprocessor capable of executing computer-executable code. The processor 36 may also include multiple processors that may perform a plurality of operations (e.g., sending and receiving data).

As mentioned above, it may be advantageous to employ a method for joining a pair of separate fiber optic cables. Accordingly, FIG. 2 is a perspective view of a pair of separated fiber optic cables. As illustrated, a first fiber optic cable 50 and a second fiber optic cable 52 may be separate fiber optic cables, or portions of a single fiber optic cable that has been severed. For example, the first fiber optic cable 50 and the second fiber optic cable 52 may both be portions of a fiber optic cable that has been severed during an operation at a wellbore site 10 (e.g., the fiber optic cable 24 was snapped by the weight of the downhole tool 22, etc.). In another example, the first fiber optic cable 50 may be configured to withstand relatively high temperatures, and the second fiber optic cable 52 may not be configured to withstand relatively high temperatures. In this example, an operator may wish to save money by minimizing an amount of high-cost, high-temperature fiber optic cable by coupling the high-temperature fiber optic cable to a length of low-cost, low-temperature fiber optic cable that is not lowered into a depth of the wellbore 12 that experiences relatively high temperatures.

As illustrated in FIG. 2, the first fiber optic cable 50 may include a first plurality of optical fibers 54 (e.g., a first set of optical fibers 54), a first tubular body 56, and a first exterior casing 58, and the second fiber optic cable 52 may include a second plurality of optical fibers 60 (e.g., a second set of optical fibers 60), a second tubular body 62, and a second exterior casing 64. In certain embodiments, the plurality of optical fibers 54, 60 may be formed of glass (e.g., silica), plastic, or another suitable material. The plurality of optical fibers 54, 60 may have a narrow circular geometry, and may be configured to carry an optical signal from a first axial end of each optical fiber 54, 60 to a second axial end of each optical fiber 54, 60.

In certain embodiments, the tubular bodies 56, 62 may be formed of glass, plastic, or another suitable material, and may extend about the respective plurality of optical fibers 54, 60. The tubular bodies 56, 62 may have a suitable refractive index (e.g., a refractive index lower than a refractive index of the plurality of optical fibers 54) to discourage attenuation. In certain embodiments, the exterior casings 58, 64 may extend about the plurality of optical fibers 54, 60 and the tubular bodies 56, 62. The exterior casings 58, 64 may be formed of a polymer, metal (e.g., Inconel®), or another suitable material. Additionally, the exterior casings 58, 64 may be configured to bear an axial load (e.g., tension or compression) and maintain an internal pressure to prevent damage to the plurality of optical fibers 54, 60 and the tubular bodies 56, 62 during operation. In certain embodiments, portions of the exterior casings 58, 64 and the tubular bodies 56, 62 may be stripped from an axial end of the first fiber optic cable 50 and an axial end of the second fiber optic cable 52 to expose portions of the plurality of optical fibers 54, 60 for a joining process. As illustrated in FIG. 2, each axial end of an optical fiber 54, 60 of the plurality of optical fibers 54, 60 may be staggered lengthwise from other axial ends. In the illustrated embodiment, the first fiber optic cable 50 and the second fiber optic cable 52 are prepared for a joining operation.

FIG. 3 is a cross-sectional view of two joined fiber optic cables. In particular, FIG. 3 illustrates the first fiber optic cable 50 and the second fiber optic cable 52, including the plurality of optical fibers 54, 60, the tubular bodies 56, 62, and the exterior casings 58, 64 of FIG. 2 in a joined state. Multiple components of the first fiber optic cable 50 and the second fiber optic cable 52 may be joined to achieve optical and structural continuity.

First, the plurality of optical fibers 54, 60 may be joined to enable transmission of optical signals from the first fiber optic cable 50 to the second fiber optic cable 52, and vice versa. In particular, in certain embodiments, the first plurality of optical fibers 54 of the first fiber optic cable 50 may be joined to the second plurality of optical fibers 60 of the second fiber optic cable 52 via a fusion splicing process, via installation of a patch cord, via application of an adhesive (e.g., glue), or another suitable process. In certain embodiments, a fusion splicing process may include heating respective axial ends of the first plurality of optical fibers 54 and the second plurality of optical fibers 60 until the respective axial ends are melted and fused to each other. In such, embodiments, the fusion splicing process may be performed using an electric arc, a laser, or another suitable method for heating the optical fibers 54, 60. In other embodiments, a patch cord installation process may include mechanically attaching a patch cord to respective axial ends of the first plurality of optical fibers 54 and the second plurality of optical fibers 60. In other embodiments, application of an adhesive may include applying an adhesive to respective axial ends of the first plurality of optical fibers 54 and the second plurality of optical fibers 60. In such embodiments, the adhesive may have a similar refractive index to the material of the first plurality of optical fibers 54 and the second plurality of optical fibers 60. In each of the above-mentioned joining techniques, a plurality of joints 70 are created between respective axial ends of the first plurality of optical fibers 54 and the second plurality of optical fibers 60. As illustrated, in certain embodiments, a longitudinal (e.g., axial) location of each joint 70 may be staggered along the length of the first plurality of optical fibers 54 of the first fiber optic cable 50 and the second plurality of optical fibers 60 of the second fiber optic cable 52.

Second, the first exterior casing 58 of the first fiber optic cable 50 and the second exterior casing 64 of the second fiber optic cable 52 may be joined to increase structural integrity and enable maintenance of a pressure within the joined fiber optic cables 50, 52. In particular, in certain embodiments, a sleeve 72 may couple to the first exterior casing 58 and the second exterior casing 64 and extend radially around all of the joints 70. The sleeve 72 may have a tubular geometry, and may have an inner diameter greater than an outer diameter of the first exterior casing 58 and the second exterior casing 64. In certain embodiments, the sleeve 72 may be formed of a polymer, metal (e.g., Inconel®), or another suitable material. In addition, in certain embodiments, the sleeve 72 may be formed of the same material as the first exterior casing 58 and/or the second exterior casing 64. In addition, in certain embodiments, an interior surface of the sleeve 72 may include materials similar to the first tubular body 56 and/or the second tubular body 62.

In certain embodiments, the sleeve 72 may be coupled to the first exterior casing 58 and the second exterior casing 64 via a plurality of coupling features 74. In particular, in certain embodiments, the plurality of coupling features 74 may be adhesives (e.g., glues or other substances that chemically react with the sleeve 72, the first exterior casing 58, and/or the second exterior casing 64), swaging or crimping locations, adhesives in addition to swaging or crimping location, metallurgical joining points, sealants, and so forth. In certain embodiments, the plurality of coupling features 74 may be located anywhere that the inner surface of the sleeve 72 and an exterior surfaces of the first exterior casing 58 or the second exterior casing 64 overlap. In certain embodiments, the plurality of coupling features 74 may include adhesives that set over time. In other embodiments, the plurality of coupling features 74 may include crimping locations, and the crimping force required to crimp the material of the sleeve 72 may be below a threshold that would damage optical fibers 54, 60 of the respective fiber optic cable 50, 52. The coupling features 74 may be designed to protect the optical fibers 54, 60 of the first fiber optic cable 50 and the second fiber optic cable 52.

In addition, in certain embodiments, the sleeve 72, the first exterior casing 58, and the second exterior casing 64 may be sealed via a plurality of o-rings 76 (e.g., sealing elements). Each o-ring 76 of the plurality of o-rings 76 may be formed of rubber, plastic, metal, or another suitable material. In certain embodiments, the plurality of o-rings 76 may be located anywhere that the inner surface of the sleeve 72 and an exterior surfaces of the first exterior casing 58 or the second exterior casing 64 overlap. The plurality of o-rings 76 enable the first fiber optic cable 50, the sleeve 72, and the second fiber optic cable 52 to maintain an internal pressure. An inner diameter of the o-rings 76 may be smaller than the outer diameters of the first exterior casing 58 and the second exterior casing 64. Accordingly, the o-rings 76 may elastically deform to fit over the first exterior casing 58 and the second exterior casing 64 to enhance the seal. The thickness of the o-rings 76 may be equal to or greater than a radial distance between the sleeve 72 and the first exterior casing 58 and the second exterior casing 64 in an installed configuration. As discussed below, the processes for joining optical fibers 54, 60 and exterior casings 58, 64 may be employed to join two fiber optic cables 50, 52 without risking damage to components of the optical fibers 54, 60.

Figure 4:
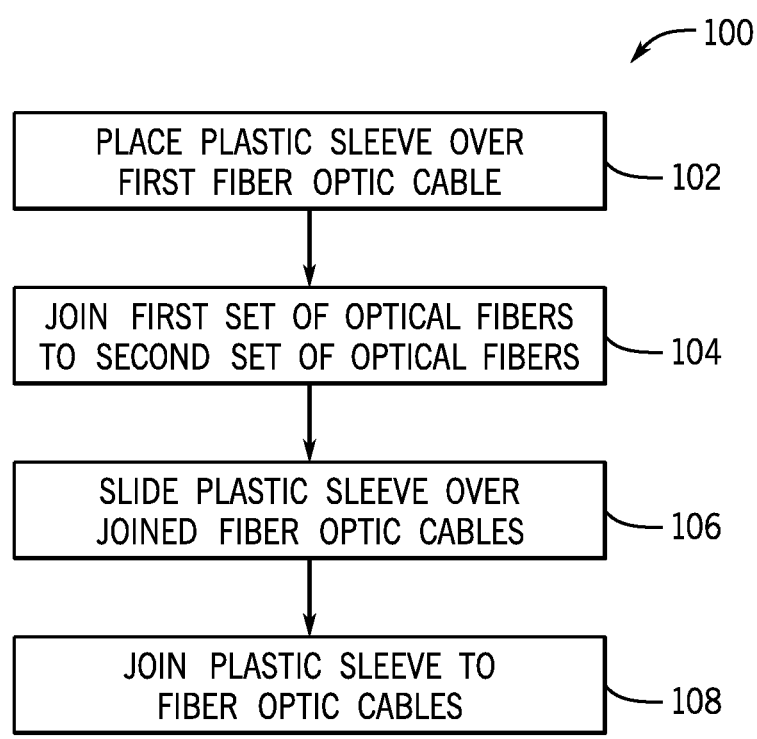
FIG. 4 is a flow diagram of a process for joining a pair of fiber optic cables, in accordance with the present disclosure.

FIG. 4 is a flow diagram of a method 100 for joining a pair of fiber optic cables 50, 52. Although the following description of the method 100 is described in a particular order, it should be noted that the method 100 is not limited to the depicted order and, instead, the method 100 may be performed in any suitable order. This method 100 (or algorithm) may be performed manually by an operator, automatically by industrial machinery, or the like, in accordance with present embodiments. In particular, while described below as being performed manually by an operator, in other embodiments, the steps of the method 100 may each be performed automatically by industrial machinery.

At block 102, the operator may slide the sleeve 72 over the first fiber optic cable 50. In other embodiments, the operator may slide the sleeve 72 over the second fiber optic cable 52. In certain embodiments, the operator may slide the sleeve 72 up a length of the first fiber optic cable 50 to enable the sleeve 72 to cover the joints 70 and couple to the exterior casings 58, 64 after the plurality of optical fibers 54, 60 are joined. In certain embodiments, when slid onto the first fiber optic cable 50, the interior surface of the sleeve 72 may be covered by a protective cover configured to protect the interior surface of the sleeve 72.

At block 104, the operator may join the first plurality of optical fibers 54 to the second plurality of optical fibers 60. As mentioned above, the operator may join the optical fibers 54, 60 via fusion splicing, a patch cord, an adhesive, or the like. These methods are expanded upon below. Joining the first plurality of optical fibers 54 to the second plurality of optical fibers 60 may allow optical signals to be communicated from the first plurality of optical fibers 54 to the second plurality of optical fibers 60, and vice versa, with minimal attenuation loss. The joining process may create the joints 70, which may have a greater diameter than the plurality of optical fibers 54, 60, in certain embodiments. Accordingly, in certain embodiments, the operator may stagger longitudinal locations of the joints 70 of the first set of optical fibers 54 of the first fiber optic cable 50 with respect to the second set of optical fibers 60 of the second fiber optic cable 52, so as to prevent a significant increase in fiber optic cable diameter near the joints 70. In other embodiments, two or more of the joints 70 may be longitudinally aligned.

At block 106, the operator may slide the sleeve 72 over the joined optical fibers 54, 60. The operator may position the sleeve 72 to equally overlap the first exterior casing 58 and the second exterior casing 64. In certain embodiments in which the interior surface of the sleeve 72 is covered by a protective cover, the operator may remove the protective cover.

At block 108, the operator may join the sleeve 72 to the first exterior casing 58 and the second exterior casing 64. As mentioned above, the operator may employ adhesives (e.g., chemical techniques), mechanical techniques, metallurgical techniques, or the like, to join the sleeve 72 to the first exterior casing 58 and the second exterior casing 64. These methods are expanded upon below. The method 100 may join the first fiber optic cable 50 to the second fiber optic cable 52. The following figure describes a more detailed embodiment of the method 100.

Figure 5:
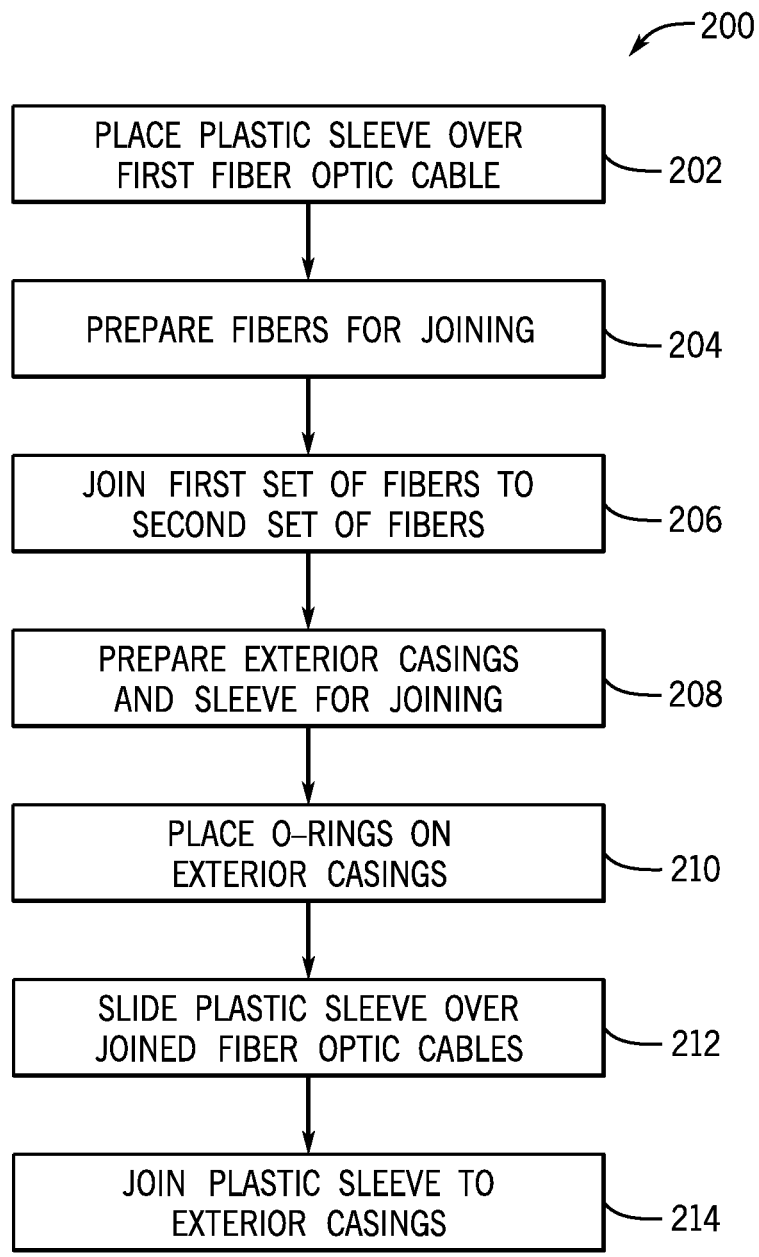
FIG. 5 is a flow diagram of another process for joining a pair of fiber optic cables, in accordance with the present disclosure.

FIG. 5 is a flow diagram of a method 200 for joining a pair of fiber optic cables 50, 52. Although the following description of the method 200 is described in a particular order, it should be noted that the method 200 is not limited to the depicted order and, instead, the method 200 may be performed in any suitable order. This method 200 (or algorithm) may be performed manually by an operator, automatically by industrial machinery, or the like, in accordance with present embodiments. In particular, while described below as being performed manually by an operator, in other embodiments, the steps of the method 200 may each be performed automatically by industrial machinery.

At block 202, the operator may slide the sleeve 72 over the first fiber optic cable 50. In other embodiments, the operator may slide the sleeve 72 over the second fiber optic cable 52. In certain embodiments, the operator may slide the sleeve 72 up a length of the first fiber optic cable 50 to enable the sleeve 72 to cover the joints 70 and couple to the exterior casings 58, 64 after the plurality of optical fibers 54, 60 are joined.

At block 204, the operator may prepare the first plurality of optical fibers 54 and the second plurality of optical fibers 60 to be joined. For example, the operator may clean the first plurality of optical fibers 54 and the second plurality of optical fibers 60 in preparation for a joining operation. The operator may align each axial end of the first plurality of optical fibers 54 with respective axial ends of the second plurality of optical fibers 60. In certain embodiments, the operator may cut axial ends of the optical fibers 54, 60 to be longitudinally staggered. For example, the operator may stagger each optical fiber 54 of the first plurality of optical fibers 54 to correspond to an optical fiber 60 of the second plurality of optical fibers 60 so that each pair of corresponding optical fibers 54, 60 may contact one another in a pre-joined configuration. In certain embodiments, the operator may cut the optical fibers 54, 60 using scissors, a blade, a heat implement, or the like.

In an embodiment including fusion splicing techniques, the operator may orient each axial end of the first plurality of optical fibers 54 to contact a respective axial end of the second plurality of optical fibers 60. In an embodiment including a patch cord, the operator may orient each axial end of the first plurality of optical fibers 54 to be spaced from a respective axial end of the second plurality of optical fibers 60 by a certain span. In an embodiment including adhesives (e.g., chemical techniques), the operator may apply an adhesive to each axial end of the first plurality of optical fibers 54 and connect each axial end to a respective axial end of the second plurality of optical fibers 60.

At block 206, the operator may join the first plurality of optical fibers 54 to the second plurality of optical fibers 60. In an embodiment including fusion splicing techniques, the operator may utilize a heating device (e.g., an electric arc device, a laser, etc.) to melt and attach each axial end of the first plurality of optical fibers 54 to the respective axial ends of the second plurality of optical fibers 60. The fusion splicing technique results in the plurality of joints 70 connecting the first plurality of optical fibers 54 to the second plurality of optical fibers 60. In an embodiment including a patch cord, the operator may mechanically connect the first plurality of optical fibers 54 to a first axial end of the patch cord and connect the second plurality of optical fibers 60 to a second axial end of the patch cord. In certain embodiments, the patch cord may include a plurality of optical fibers having the same refractive index as the first plurality of optical fibers 54 and the second plurality of optical fibers 60. In certain embodiments, the patch cord may also include a first connector at the first axial end and a second connector at the second axial end. In such embodiments, the first connector and second connector may be configured to mechanically connect the plurality of optical fibers of the patch cord to the first plurality of optical fibers 54 and the second plurality of optical fibers 60, respectively. In an embodiment including adhesives, the operator may set the adhesives. The adhesives may be set using heat (e.g., via a heat gun), a catalyst compound (e.g., chemically), or by allowing the adhesive to set over a period of time.

At block 208, the operator may prepare the sleeve 72, the first exterior casing 58, and the second exterior casing 64 for joining. For example, the operator may clean the interior surface of the sleeve 72, as well as the exterior surfaces of the first exterior casing 58 and the second exterior casing 64. In embodiments including adhesives (e.g., chemically joining), the operator may apply adhesives to the interior surface of the sleeve 72 and/or to the exterior surfaces of the first exterior casing 58 and the second exterior casing 64. In embodiments including metallurgical techniques (e.g., metallurgical joining), the operator may remove oxidation or imperfections from the interior surface of the sleeve 72, as well as the exterior surfaces of the first exterior casing 58 and the second exterior casing 64, before metallurgically joining the sleeve 72, the first exterior casing 58, and the second exterior casing 64.

At block 210, the operator may place o-rings 76 on the first exterior casing 58 and the second exterior casing 64. In certain embodiments, the operator may elastically deform the o-rings 76 to fit on the first exterior casing 58 and the second exterior casing 64. The o-rings 76 may be placed at any longitudinal locations on the first exterior casing 58 and the second exterior casing 64 that longitudinally overlap with the sleeve 72 in an installed configuration. Additionally, the operator may place any number (e.g., 1, 2, 3, 4, etc.) of o-rings 76 on the first exterior casing 58 and the second exterior casing 64.

At block 212, the operator may slide the sleeve 72 over the joined optical fibers 54, 60. In certain embodiments, the operator may position the sleeve 72 to equally overlap the first exterior casing 58 and the second exterior casing 64. In embodiments including adhesives, the operator may position the sleeve 72 to overlap portions of the interior surface of the sleeve 72 covered in the adhesive with portions of the first exterior casing 58 and the second exterior casing 64 covered in adhesive.

At block 214, the operator may join the sleeve 72 to the first exterior casing 58 and the second exterior casing 64. In embodiments including chemical joining (e.g., adhesives), the operator may cause the adhesives applied to the sleeve 72, the first exterior casing 58, and the second exterior casing 64 to set. In certain embodiments, the operator may set the adhesives using heat (e.g., via a heat gun), a catalyst compound (e.g., chemically), or by allowing the adhesive to set over a period of time. In certain embodiments, the adhesive applied to the sleeve 72 is a first part of an epoxy, and the adhesive applied to the first exterior casing 58 and the second exterior casing 64 is a second part of the epoxy. In such embodiments, once the first part of the epoxy contacts the second part of the epoxy, the epoxy sets, joining the sleeve 72 to the first exterior casing 58 and the second exterior casing 64. In embodiments including mechanical joining, the operator may use a swaging or crimping device to swage or crimp areas of the sleeve 72 to the first exterior casing 58 and the second exterior casing 64. In embodiments including metallurgical joining, the operator may join the sleeve 72 to the first exterior casing 58 and the second exterior casing 64 via a welding process, a brazing process, a soldering process, a friction seizure, or the like. In certain embodiments, the operator chooses a particular joining technique(s) to ensure that the optical fibers 54, 60 of the first fiber optic cable 50 and the second fiber optic cable 52 are not damaged during the joining process. Once the method 200 is complete, the operator may choose to perform one or more testing operations, as detailed below.

Figure 6:
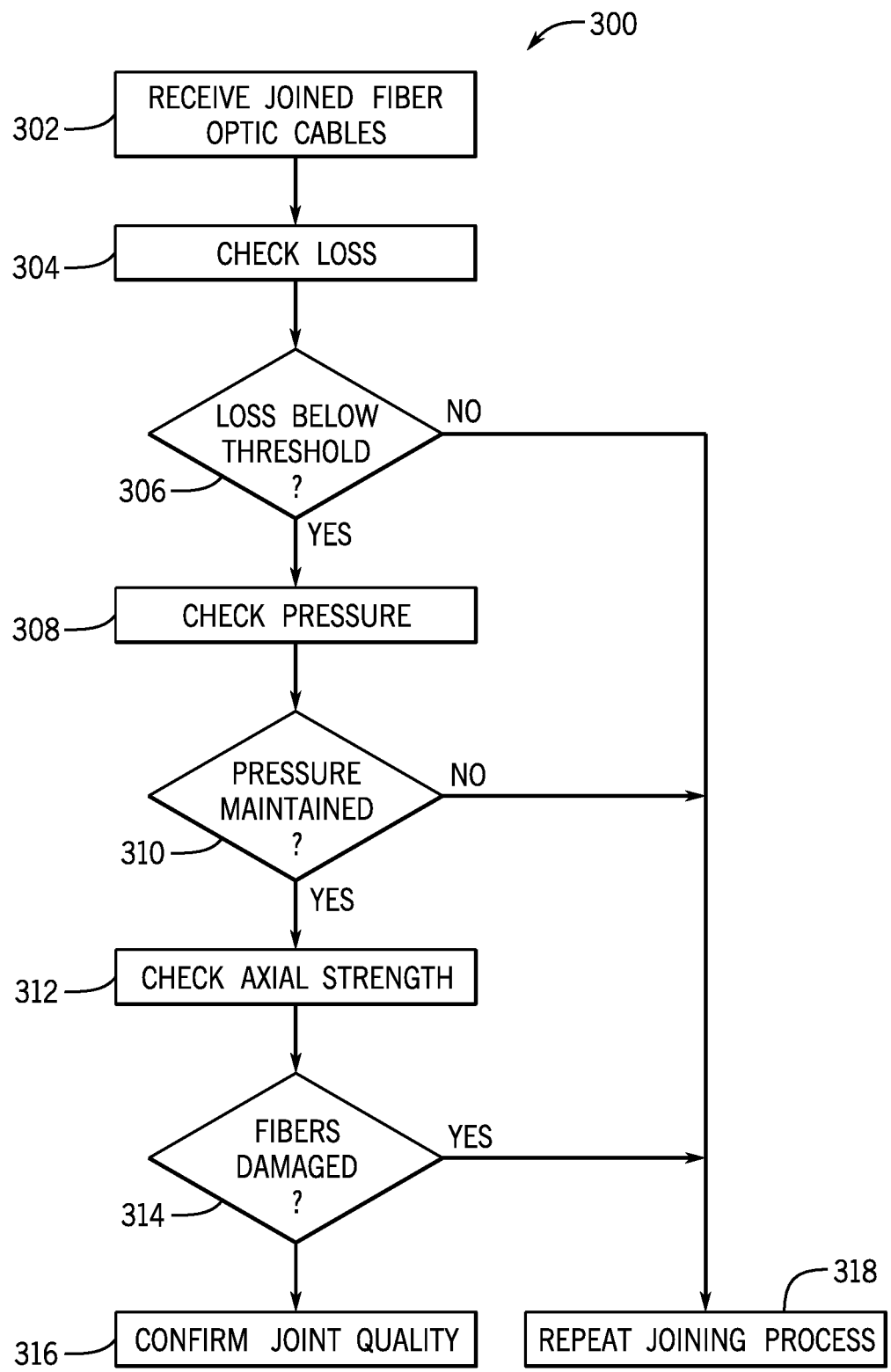
FIG. 6 is a flow diagram of a process for testing a pair of joined fiber optic cables, in accordance with the present disclosure.

FIG. 6 is a flow diagram of a method 300 for testing a pair of joined fiber optic cables. Although the following description of the method 300 is described in a particular order, it should be noted that the method 300 is not limited to the depicted order; and, instead, the method 300 may be performed in any suitable order. This method 300 (or algorithm) may be performed manually by an operator, automatically by industrial machinery, or the like, in accordance with present embodiments. In particular, while described below as being performed manually by an operator, in other embodiments, the steps of the method 300 may each be performed automatically by industrial machinery.

At block 302, the operator may receive the joined pair of the first fiber optic cable 50 and the second fiber optic cable 52. The pair of fiber optic cables 50, 52 may be joined via any of the methods described above with reference to FIGS. 4 and 5, or via another suitable method.

At block 304, the operator may test the joined fiber optic cables 50, 52 for attenuation loss. In certain embodiments, the operator may utilize a testing apparatus (e.g., the electromagnetic source 30 and the optical detector 34, an optical testing apparatus, etc.) to determine an amount of attenuation loss experienced by an optical signal transmitted through the joined fiber optic cables 50, 52. In one embodiment, the operator may connect a first axial end of the joined fiber optic cables 50, 52 to the electromagnetic source 30, and may connect a second axial end of the joined fiber optic cables 50, 52 to the optical detector 34. Then, the electromagnetic source 30 may send an optical signal to the optical detector 34 via the joined fiber optic cables 50, 52. Then, a processor 36 coupled to the electromagnetic source 30 and the optical detector 34 may then determine an amount of attenuation loss.

At block 306, the operator may determine whether the amount of attenuation loss experienced by the joined fiber optic cables 50, 52 is greater than a threshold amount of attenuation loss. If the amount of attenuation loss experienced by the joined fiber optic cables 50, 52 is greater than a threshold amount of attenuation loss, the method 300 continues to block 318. If the amount of attenuation loss experienced by the joined fiber optic cables 50, 52 is less than a threshold amount of attenuation loss, the method 300 continues to block 308.

At block 308, the operator may test the joined fiber optic cables 50, 52 to determine whether the joined fiber optic cables 50, 52 can maintain an internal pressure. In certain embodiments, the operator utilize a testing apparatus (e.g., a pressure testing apparatus) to determine whether the joined fiber optic cables 50, 52 can maintain a threshold internal pressure. For example, the operator may connect each axial end of the joined fiber optic cables 50, 52 to an apparatus that may pump compressed air or nitrogen into the joined fiber optic cables 50, 52 and measure the internal pressure over a period of time. A decrease in pressure over the period of time may indicate a defective seal.

At block 310, the operator may determine whether the joined fiber optic cables 50, 52 can maintain an internal pressure. If the joined fiber optic cables 50, 52 cannot maintain an internal pressure, the method 300 continues to block 318. If the joined fiber optic cables 50, 52 can maintain an internal pressure, the method 300 continues to block 312.

At block 312, the operator may test the joined fiber optic cables 50, 52 to determine whether the joined fiber optic cables 50, 52 can withstand a threshold axial load. In certain embodiments, the operator may utilize a testing apparatus (e.g., a tensile testing apparatus) to determine whether the joined fiber optic cables 50, 52 can withstand a threshold compressive load or a threshold tensile load. For example, the operator may connect each axial end of the joined fiber optic cables 50, 52 to a tensile testing apparatus and impose tensile and compressive loads on the joined fiber optic cables 50, 52.

At block 314, the operator may determine whether the joined fiber optic cables 50, 52 can withstand the threshold compressive and tensile loads. If the joined fiber optic cables 50, 52 cannot withstand the threshold compressive and tensile loads, the method 300 continues to block 318. If the joined fiber optic cables 50, 52 can withstand the threshold compressive and tensile loads, the method 300 continues to block 316.

At block 316, the operator confirms that the joined fiber optic cables 50, 52 are of sufficient quality, at which point the operator may approve the joined fiber optic cables 50, 52 for use at a wellbore site 10, and may indicate in an inventory that the joined fiber optic cables 50, 52 passed attenuation loss tests, pressure tests, and axial strength tests.

At block 318, the operator may repeat the joining process. In particular, the operator may determine, based on a failed attenuation loss test, a failed pressure test, a failed axial strength test, or a combination thereof that the joined fiber optic cables 50, 52 are not of sufficient quality. In response, the operator may remove the joined portion of the fiber optic cables 50, 52 and repeat the joining process.

It should be understood that the above methods of joining optical fibers 54, 60 and the methods of joining exterior casings 58, 64 can be used in any combination. For example, in certain embodiments, the operator may join the optical fibers 54, 60 via fusion splicing, and the operator may join the exterior casings 58, 64 chemically (e.g., via an adhesive). In another example, the operator may join the optical fibers 54, 60 via fusion splicing, and the operator may join the exterior casings 58, 64 mechanically. In another example, the operator may join the optical fibers 54, 60 via fusion splicing, and the operator may join the exterior casings 58, 64 metallurgically. In yet another example, the operator may join the optical fibers 54, 60 via a patch cord, and the operator may join the exterior casings 58, 64 chemically (e.g., via an adhesive). In another example, the operator may join the optical fibers 54, 60 via a patch cord, and the operator may join the exterior casings 58, 64 mechanically. In another example, the operator may join the optical fibers 54, 60 via a patch cord, and the operator may join the exterior casings 58, 64 metallurgically. In yet another example, the operator may join the optical fibers 54, 60 chemically (e.g., via an adhesive), and the operator may join the exterior casings 58, 64 chemically (e.g., via an adhesive). In another example, the operator may join the optical fibers 54, 60 chemically (e.g., via an adhesive), and the operator may join the exterior casings mechanically. In another example, the operator may join the optical fibers 54, 60 chemically (e.g., via an adhesive), and the operator may join the exterior casings 58, 64 metallurgically. In these examples, it should be noted that the plurality of optical fibers 54, 60 may be staggered or aligned longitudinally. Additionally, the exterior casings 58, 64 may be joined to the sleeve 72 metal-to-metal, or o-rings (e.g., sealing elements) may be disposed between the sleeve 72 and the exterior casings 58, 64. Furthermore, the optical fibers 54, 60 of the first fiber optic cable 50 may be the same type of optical fibers 54, 60 that are used in the second fiber optic cable 52, or the optical fibers 54, 60 may be different types of optical fibers 54, 60. For example, the first set of optical fibers 54 may be high-temperature optical fibers (e.g., capable of operating in temperatures above 200° C., for example), and the second set of optical fibers 60 may be low-temperature optical fibers (e.g., capable of operating in temperatures up to 120° C.).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

What is claimed is:

1. A method for joining fiber optic cables, comprising:
   sliding a sleeve over a first fiber optic cable, wherein the sleeve has an inner diameter greater than an outer diameter of a first exterior casing of the first fiber optic cable that extends about a first set of optical fibers over a length of a first tubular body of the first fiber optic cable, wherein the first set of optical fibers is disposed within the first tubular body;
   joining the first set of optical fibers of the first fiber optic cable to a second set of optical fibers disposed within a second tubular body of a second fiber optic cable;
   sliding the sleeve over the first and second fiber optic cables, wherein the sleeve has an inner diameter greater than an outer diameter of a second exterior casing of the second fiber optic cable that extends about the second set of optical fibers over a length of the second tubular body; and
   joining the sleeve to the first exterior casing of the first fiber optic cable and to the second exterior casing of the second fiber optic cable, wherein the sleeve comprises a same material as the first exterior casing and the second exterior casing, and wherein joining the sleeve to the first exterior casing of the first fiber optic cable and to the second exterior casing of the second fiber optic cable comprises metallurgically joining the sleeve to the first exterior casing of the first fiber optic cable and to the second exterior casing of the second fiber optic cable by:
      utilizing welds between at least one of: the sleeve, the first exterior casing, or the second exterior casing;
      utilizing friction seizures between at least one of: the sleeve, the first exterior casing, or the second exterior casing; or
      a combination thereof.

2. The method of claim 1, wherein joining the first set of optical fibers of the first fiber optic cable to the second set of optical fibers of the second fiber optic cable comprises fusion splicing the first set of optical fibers of the first fiber optic cable to the second set of optical fibers of the second fiber optic cable.

3. The method of claim 1, wherein joining the first set of optical fibers of the first fiber optic cable to the second set of optical fibers of the second fiber optic cable comprises using a patch cord to join the first set of optical fibers of the first fiber optic cable to the second set of optical fibers of the second fiber optic cable.

4. The method of claim 1, further comprising staggering longitudinal locations of joints of the first set of optical fibers of the first fiber optic cable to the second set of optical fibers of the second fiber optic cable.

5. The method of claim 1, wherein joining the sleeve to the first exterior casing of the first fiber optic cable and to the second exterior casing of the second fiber optic cable further comprises mechanically joining the sleeve to the first exterior casing of the first fiber optic cable and to the second exterior casing of the second fiber optic cable.

6. The method of claim 5, wherein mechanically joining the sleeve to the first exterior casing of the first fiber optic cable and to the second exterior casing of the second fiber optic cable comprises:
   utilizing threads or threaded devices on at least one of: the sleeve, the first exterior casing, or the second exterior casing;

utilizing swaging or crimping on at least one of: the sleeve, the first exterior casing, or the second exterior casing; or a combination thereof.

7. The method of claim 1, wherein joining the sleeve to the first exterior casing of the first fiber optic cable and to the second exterior casing of the second fiber optic cable further comprises chemically joining the sleeve to the first exterior casing of the first fiber optic cable and to the second exterior casing of the second fiber optic cable.

8. The method of claim 7, wherein chemically joining the sleeve to the first exterior casing of the first fiber optic cable and to the second exterior casing of the second fiber optic cable comprises:

utilizing glues, utilizing adhesives, utilizing substances that chemically react with at least one of: the sleeve, the first exterior casing, or the second exterior casing; or a combination thereof.

9. The method of claim 1, further comprising installing a first set of sealing elements between the sleeve and the first exterior casing and installing a second set of sealing elements between the sleeve and the second exterior casing.

10. The method of claim 1, wherein the first set of optical fibers of the first fiber optic cable and the second set of optical fibers of the second fiber optic cable are different types of optical fibers.

11. The method of claim 1, further comprising:

attaching the first fiber optic cable and the second fiber optic cable to an optical testing apparatus; and determining, via the optical testing apparatus, that an attenuation loss of the first fiber optic cable and the second fiber optic cable is less than a threshold attenuation loss value.

12. The method of claim 1, further comprising:

attaching the first fiber optic cable and the second fiber optic cable to a pressure testing apparatus; and determining, via the pressure testing apparatus, that the first fiber optic cable and the second fiber optic cable can maintain a threshold pressure.

13. The method of claim 1, further comprising:

attaching the first fiber optic cable and the second fiber optic cable to a tensile testing apparatus; and determining, via the tensile testing apparatus, that a tensile strength of the first fiber optic cable and the second fiber optic cable is greater than a threshold tensile strength value.

14. The method of claim 9, wherein the first set of sealing elements comprises a first set of o-rings and the second set of sealing elements comprises a second set of o-rings.

15. A method for joining a pair of fiber optic cables for use in a wellbore site operation, comprising:

sliding a sleeve over a first fiber optic cable, wherein the sleeve has an inner diameter greater than an outer diameter of a first exterior casing of the first fiber optic cable that extends about a first set of optical fibers over a length of a first tubular body of the first fiber optic cable, wherein the first set of optical fibers is disposed within the first tubular body;

joining the first set of optical fibers of the first fiber optic cable to a second set of optical fibers disposed within a second tubular body of a second fiber optic cable;

sliding the sleeve over the first and second fiber optic cables, wherein the sleeve has an inner diameter greater than an outer diameter of a second exterior casing of the second fiber optic cable that extends about the second set of optical fibers over a length of the second tubular body; and joining the sleeve to the first exterior casing of the first fiber optic cable and to the second exterior casing of the second fiber optic cable, wherein the sleeve comprises a same material as the first exterior casing and the second exterior casing, and wherein joining the sleeve to the first exterior casing of the first fiber optic cable and to the second exterior casing of the second fiber optic cable comprises metallurgically joining the sleeve to the first exterior casing of the first fiber optic cable and to the second exterior casing of the second fiber optic cable by:

utilizing welds between at least one of: the sleeve, the first exterior casing, or the second exterior casing;

utilizing friction seizures between at least one of: the sleeve, the first exterior casing, or the second exterior casing; or a combination thereof; and utilizing the first fiber optic cable and the second fiber optic cable to communicate an optical signal to or from a downhole tool.

16. The method of claim 15, wherein joining the first set of optical fibers of the first fiber optic cable to the second set of optical fibers of the second fiber optic cable comprises fusion splicing the first set of optical fibers of the first fiber optic cable to the second set of optical fibers of the second fiber optic cable.

17. The method of claim 15, further comprising:

attaching the first fiber optic cable and the second fiber optic cable to an optical testing apparatus; and determining, via the optical testing apparatus, that an attenuation loss of the first fiber optic cable and the second fiber optic cable is less than a threshold attenuation loss value.

* * * * *